April 7, 1970    J. F. MACON    3,504,836
MEANS FOR ADVANCING OR CONVEYING MATERIAL
Original Filed Jan. 13, 1967    4 Sheets-Sheet 1

INVENTOR.
JACK F. MACON
BY
Cushman, Darby & Cushman
ATTORNEYS

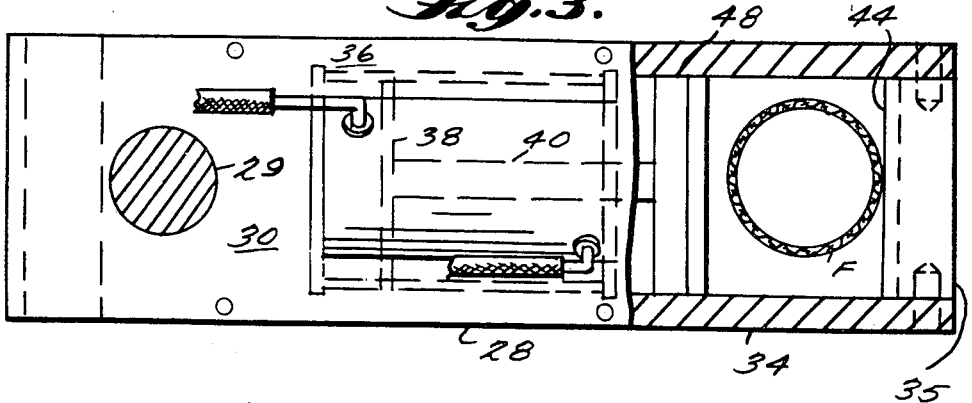
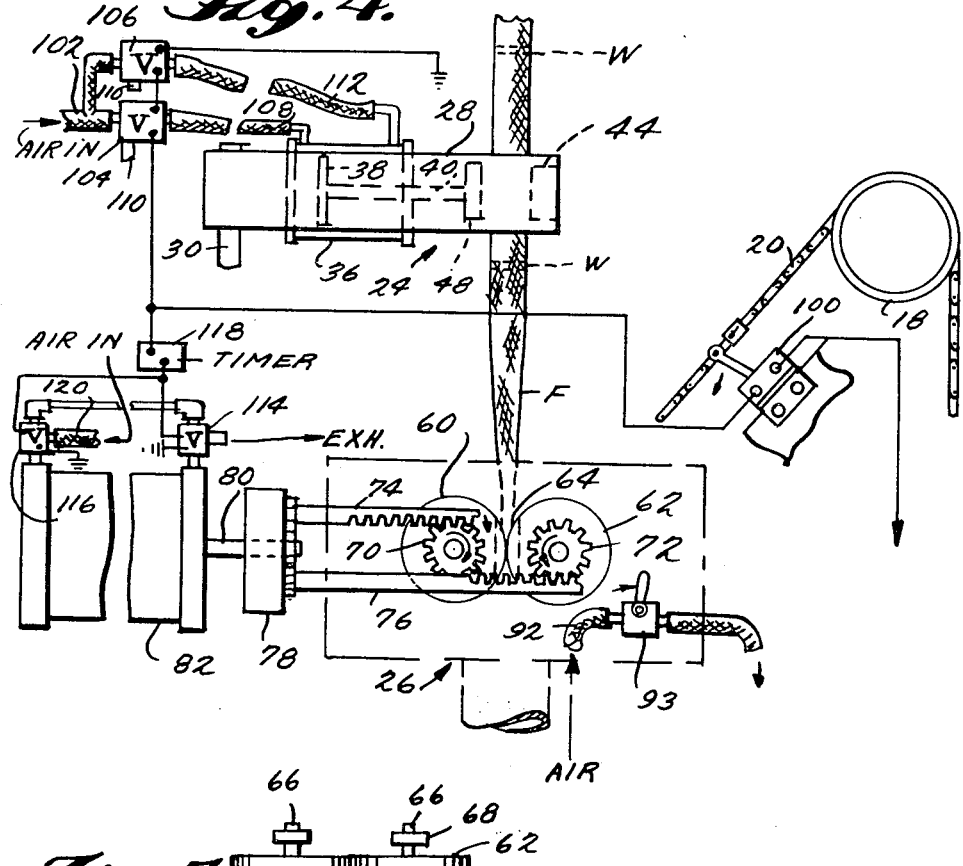
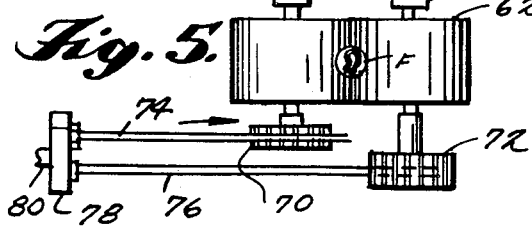

April 7, 1970  J. F. MACON  3,504,836
MEANS FOR ADVANCING OR CONVEYING MATERIAL
Original Filed Jan. 13, 1967  4 Sheets-Sheet 4
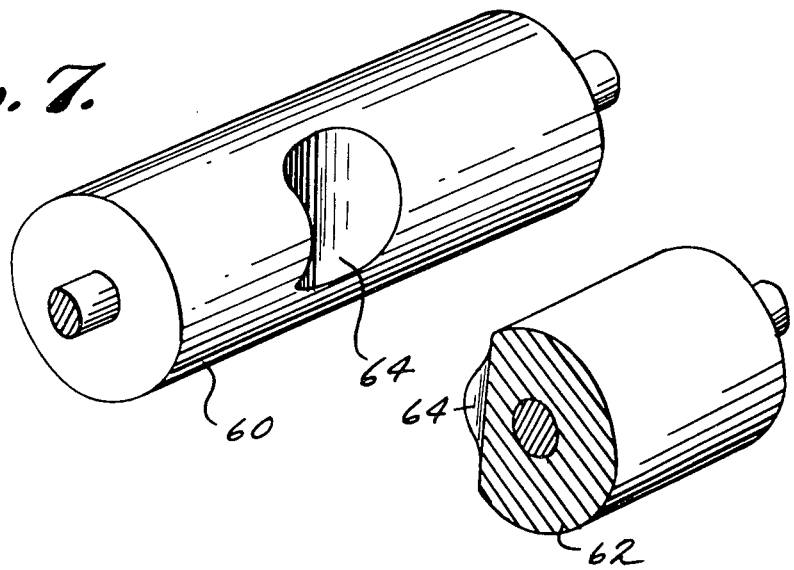
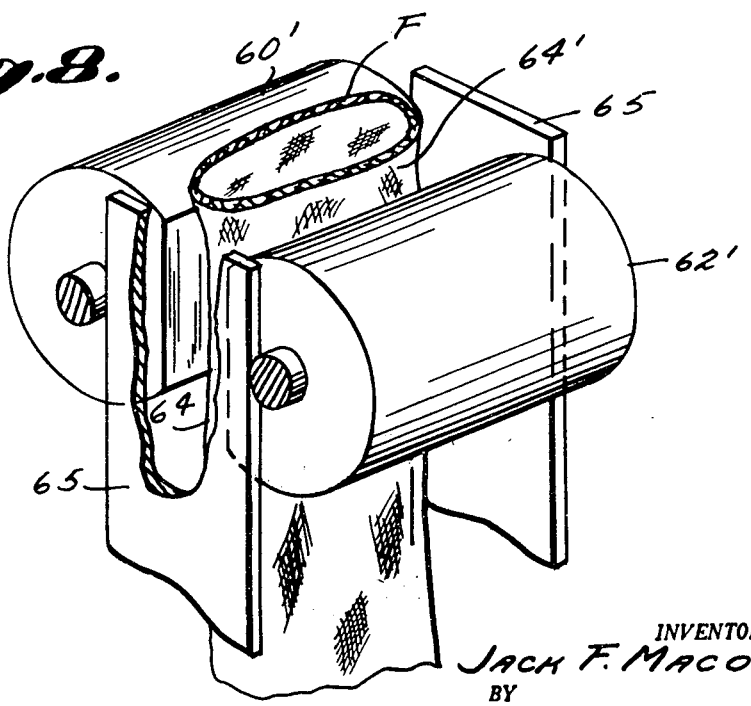
INVENTOR.
JACK F. MACON
BY
Cushman, Darby & Cushman
ATTORNEYS United States Patent Office 3,504,836
Patented Apr. 7, 1970

3,504,836
MEANS FOR ADVANCING OR CONVEYING
MATERIAL
Jack F. Macon, High Point, N.C., assignor to Burlington Industries, Inc., Greensboro, N.C., a corporation of Delaware
Original application Jan. 13, 1967, Ser. No. 609,149, now Patent No. 3,448,594. Divided and this application Jan. 7, 1969, Ser. No. 789,462
Int. Cl. B65h 17/22
U.S. Cl. 226—153    3 Claims

ABSTRACT OF THE DISCLOSURE

A device for positively engaging and differentially conveying an article or material passing therethrough. The device includes at least one roller cooperating with an opposed surface, the roller having a portion of its peripheral surface defining with the opposed surface a nip which cooperates to positively engage and convey the article during a portion of the rotation of the roller and another portion of its peripheral surface defining a nip with the opposed surface which is out of contact with the article or material and therefore does not positively influence the movement of the article or material. The roller may be intermittently or continuously rotated.

---

This application is a division of application Ser. No. 609,149, filed Jan. 13, 1967, now U.S. Patent No. 3,448,594.

The present invention relates to an improvement in a device for advancing or conveying articles or material and will be described in relationship to an apparatus for separating articles from a tubular fabric continuously produced on a circular knitting machine or the like and, more particularly, to an apparatus for separating hosiery such as half hose or the like knitted in succession and joined end to end by a weaker portion, the separation being accomplished by tearing or ripping the weakened portion.

In the production of articles on circular knitting machines, the articles are usually continuously and successively knitted and subsequently the articles are separated from each other into individual units from which they are made into the finished product such as half hose or the like. In the knitting process, one article is joined to another by courses formed of a joining thread having special characteristics which permit the subsequent separation. In some instances, the joining thread is made of a yarn which is weaker relative to the other yarns making up the fabric and this permits the application of tension to the fabric for ripping or tearing the articles apart. Oftentimes in the past, the separation of the articles was accomplished by hand which was a time-consuming and costly procedure.

More recently an apparatus has been developed for use with a circular knitting machine, such apparatus including clamping means for clamping the tubular fabric at predetermined intervals above the portion to be separated, the apparatus also including continuously rotating pulling rollers and guide means for moving the tubular fabric into and out of gripping engagement between the nip of the pulling rollers so that the pulling rollers could exert a grip on the fabric and pull the same against the clamping action of the clamping means. Such prior apparatus is disclosed in the United States Patent No. 3,282,070, issued Nov. 1, 1966, to Charles William Perkins and involved utilizing rather large steel core rollers sheathed with yieldable sleeves, the rollers being continuously rotated by high voltage electric motors. Complicated guiding means including a movable funnel and linkage to move the same was provided to bodily move the fabric transversely of its normal path of movement engagement with the pulling means. While the aforementioned apparatus has proved generally satisfactory, especially over the prior hand operation, it does have certain disadvantages in that the cost of installation and maintenance is quite high. The cost of installation is initially quite high in that the heavy pulling rollers are continuously operated at a high speed and thus necessitates a high voltage electric motor. The use of a high voltage motor requires specially trained electricians for installation and continuous maintenance as the system had to be shielded because of the high voltage. Additionally, the continuous running of the rollers at high r.p.m. and continuous contact of the rollers with one another results in added maintenance because of the necessary of replacement of bearings as well as replacement of roller sleeves due to the increased temperature of operation.

An object of the present invention is to provide an improved apparatus for successively separating articles from a fabric knitted in tubular form on a circular knitting machine, the apparatus providing for improved overall operation with reduction in initial installation cost and subsequent maintenance and labor costs.

Still another object of the present invention is to provide an improved apparatus for separating articles such as half hose or the like continuously knitted in tubular form on a circular knitting machine, the apparatus operating on the tubular fabric in a generally straight line as the tubular fabric passes downwardly from the needle cylinder of the circular knitting machine. By performing the separation of the articles in a generally straight line without the tubular fabric being moved transversely of its normal path of movement, there is less opportunity for the tubular fabric to be damaged so that the resulting articles become seconds or discards.

A still further object of the present invention is to provide an improved apparatus having a minimum number of actuating parts operating at a minimum time, the apparatus utilizing a combination electrical and pneumatic source of power with the electrical source of power capable of being run off the same low voltage system that operates the circular knitting machine.

Ancillary to the immediately preceding object, it is a further object of the present invention to provide an improved apparatus in which the pulling rollers need be rotated only one revolution or less to separate the articles from the tubular fabric, the tubular fabric being guided between the rollers at all times.

These and other objects and advantages of the present invention will appear more fully in the following specification, claims and accompanying drawings in which:

FIGURE 3 is a plan view partly in section of the clamping means illustrated in FIGURE 2;

FIGURE 4 is a schematic view of the apparatus of the present invention and illustrating the clamping means and the pulling rollers in their inoperative position as the tubular fabric is continuously passing therethrough;

FIGURE 5 is a plan view of the pulling rollers and the means for actuating the same, the rollers being illustrated in their stationary or inoperative position;

FIGURE 7 is an enlarged fragmentary perspective view of the pulling rollers of the present invention, the view illustrating the rollers in an exaggerated separation so that the cooperating grooves in peripheral surfaces of the rollers for permitting the tubular fabric to pass therebetween when the rollers are stationary can be seen; and FIGURE 8 is an enlarged fragmentary perspective view of a modified pair of pulling rollers.

Figure 1:
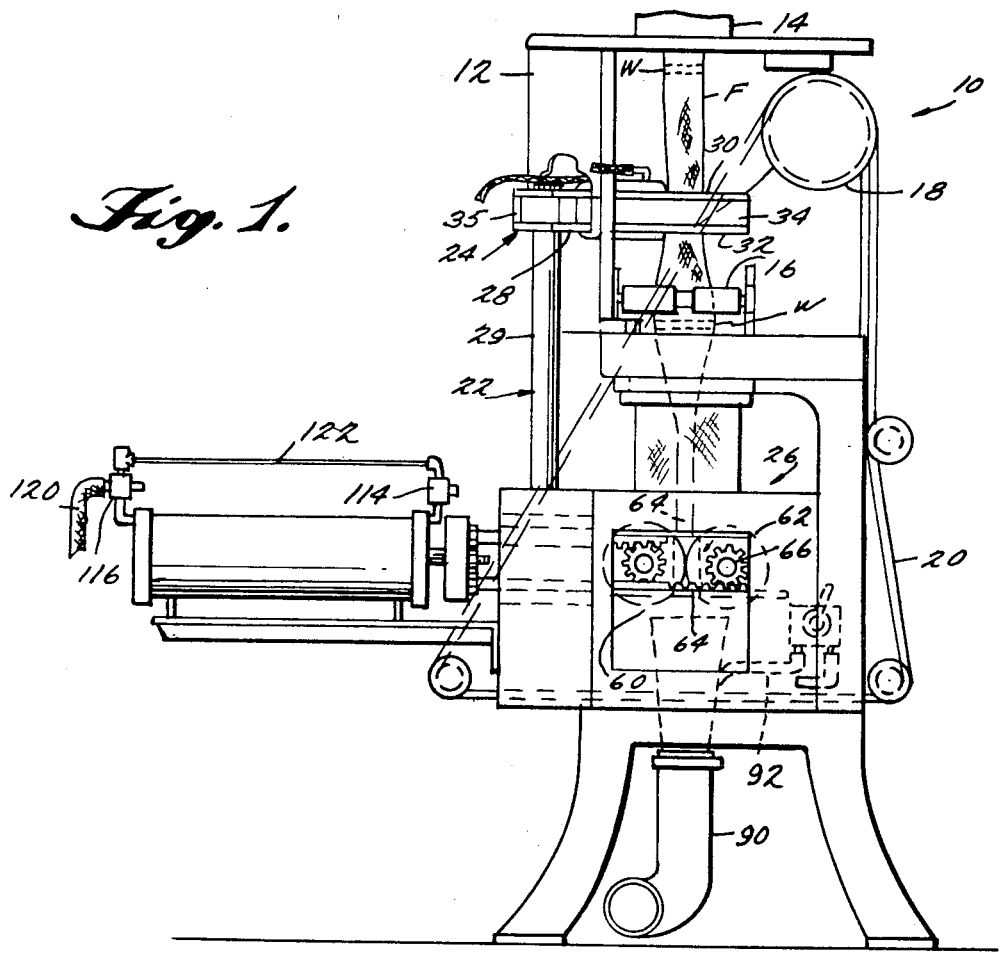
FIGURE 1 is a side elevational view of the improved apparatus of the present invention, the apparatus being shown installed on the lower part of a conventional circular knitting machine.

Referring now to the drawings wherein like characters or reference numerals represent like or similar parts, FIGURE 1 illustrates a portion of a conventional circular knitting machine generally designated at 10, for example, a 400-needle Model KN Scott and Williams machine or, for example, a machine known in the trade as a "Komet" circular knitting machine. It is known that circular knitting machines are especially adaptable for continuously knitting a fabric in tubular form, the articles or units knitted being connected in end to end relationship by courses of yarn. While circular knitting machines are used primarily to knit half hose and women's seamless hosiery, they may also be utilized to knit other products which can be made from the tubular fabric such as sweaters or the like.

Only those parts of the circular knitting machine necessary for comprehension of the present invention are illustrated, it being understood that the knitting machine operates in a conventional manner.

In more detail, the circular knitting machine 10 of conventional design includes a frame structure 12 on which is mounted a needle cylinder 14, conventional take-down rollers 16 positioned beneath the needle cylinder, a pattern drum 18 and a pattern chain 20. The pattern chain 20 is continuously moving and is provided with lugs suitably arranged to control, in a conventional manner, the pattern drum 18 which in turn controls the number and type stitches, floats and courses knitted by the needle cylinder 14. A more detailed description of the parts of the circular knitting machine 10 is not necessary due to their conventional operation and it suffices in stating the fabric F is continuously knitted in tubular form and passes downwardly from the needle cylinder 14 through the take-down rollers 16 which normally apply the proper tension to the yarns in the needle cylinder. As is also well known in the art, the pattern chain 20 and pattern drum 18 so control the needle cylinder 14 that at periodic intervals, for example, upon completion of an article and the starting of another article, the new article being knitted is connected to the previously knitted article by courses of thread made from a yarn which is weaker than the yarn of the article. As shown throughout the drawings, the weaker courses define a weakened portion transverse of the tubular fabric F between the articles, the weakened portions being shown in broken lines and identified by the letter W.

The apparatus of the present invention includes a frame structure 22 mounted on the frame structure 12 of the circular knitting machine 10 beneath the needle cylinder 14. The frame structure 22 supports a clamping means generally designated at 24 and positioned immediately above the take-down rollers 16 and in general vertical alignment with the axis of the needle cylinder 14 as well as pulling means generally designated at 26, the pulling means 26 also being generally in vertical alignment with the axis of the needle cylinder 14 and positioned below the take-down rollers 16.

Figure 2:
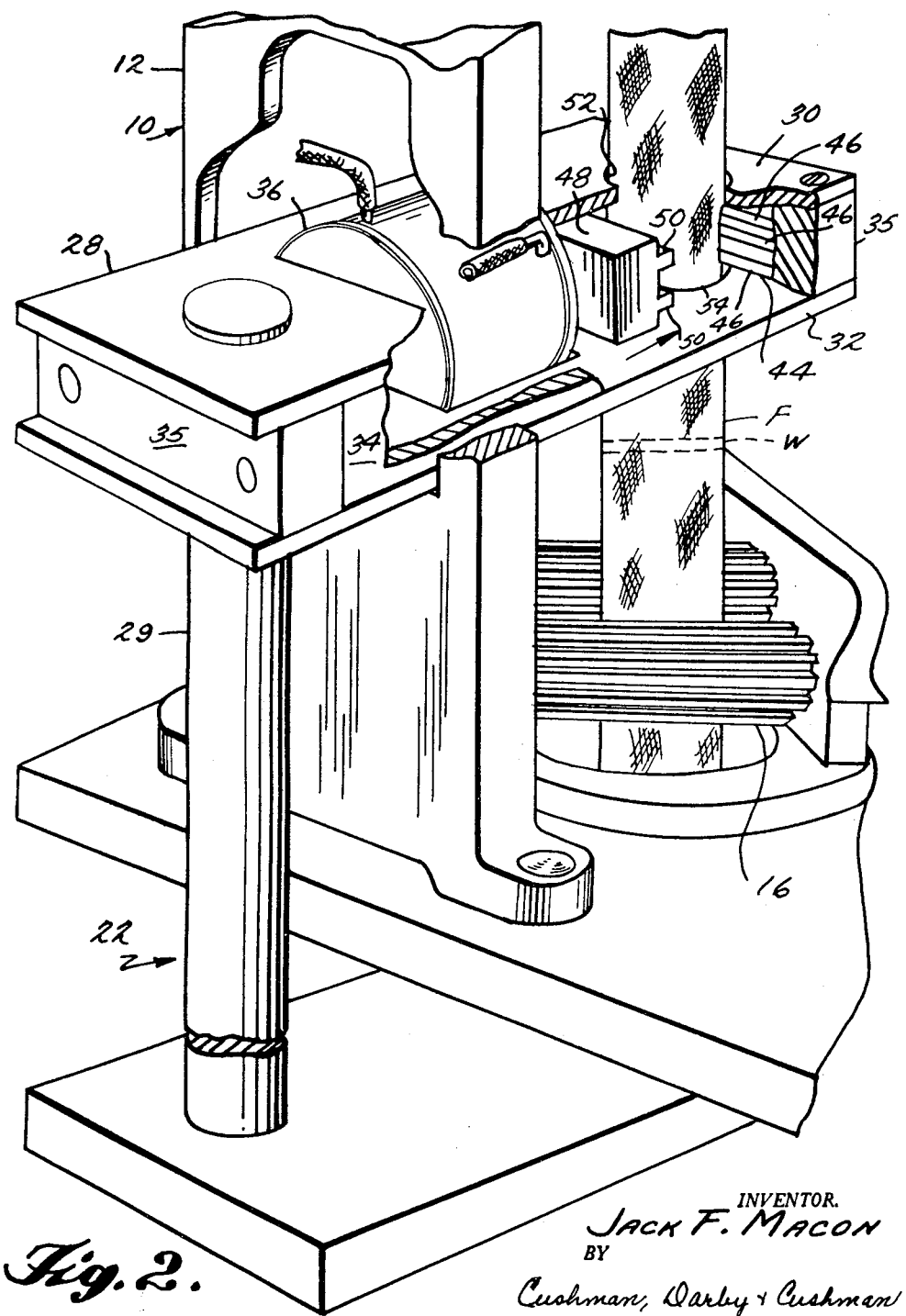
FIGURE 2 is an enlarged fragmentary view of a portion of the apparatus shown in FIGURE 1, the view illustrating the clamping means positioned above the conventional takedown rollers of the circular knitting machine.

Referring now in particular to FIGURES 1, 2 and 3, the clamping means 24 includes a platform member 28 supported on the upper end of a standard 29 of the frame structure 22, the platform member 28 comprising a pair of plates 30 and 32 supported in spaced relationship to each other by side walls 34 and end walls 35. Suitably supported by the platform member 28 is an air cylinder 36 having a piston 38 and a piston rod 40 connected to the piston for extending from the casing of the air cylinder.

One of the end walls 35 of platform member 28 defines a fixed clamping bar 44 having horizontally extending and vertically spaced ribs 46 facing inwardly of the member 28. A second clamping bar 48 is mounted on the end of the piston rod 40 within the platform member 28 and is movable toward and away from the clamping bar 44. The clamping bar 48 also has horizontally extending and vertically spaced ribs 50, the ribs 50 being so positioned that they intermesh with or fit between the ribs 46 when the clamping bar 48 is in clamping engagement with the clamping bar 44. An aperture 52 is provided in the upper plate 30 and is aligned with an aperture 54 in the lower plate 32, the apertures 52 and 54 also being axially aligned with the needle cylinder 14. As will now be apparent from FIGURES 2 and 3, the tubular fabric F, as it is knitted, continuously and freely passes downwardly through the apertures 52 and 54 between the clamping bars 44 and 48 until such time as the air cylinder 36 is actuated to cause the clamping bar 48 to move into clamping engagement with the clamping bar 44 with the tubular fabric therebetween. When this occurs, movement of the tubular fabric F is arrested at the clamping means 24.

Referring now to FIGURES 1, 4 and 5, it will be noted that the pulling means 26 includes a pair of cylindrically shaped rollers 60 and 62 rotatably mounted on spaced horizontal axes, the rollers 60 and 62 having a nip therebetween vertically aligned with the clamping means 24 and the vertical axis of needle cylinder 14. The rollers 60 and 62 are preferably made of rubber and, although generally cylindrically shaped, are provided with means to permit the tubular fabric F to pass therebetween when the rollers are stationary, the means defining a cutaway portion on at least one of the rollers.

As best shown in FIGURE 7 and as also shown in FIGURES 1, 4, 5 and 6, each of the rollers 60 and 62 is provided with a transverse groove 64 in a portion of its peripheral surface. Preferably the grooves 64 are arcuate in cross section with the edges of the grooves being smooth to prevent snagging of tubular fabric passing therebetween. When the grooves 64 of the rollers 60 and 62 oppose each other as shown in FIGURES 1, 4 and 5, they define a passageway through the nip of the rollers which is axially aligned with the clamping means 24 and the needle cylinder 14 and thus will permit the tubular fabric F to pass therethrough unobstructed as knitting takes place. Of course, the rollers 60 and 62 are stationary at this time. Since the tubular fabric F is completely encircled by the grooves, the grooves also define a guide for the tubular fabric and thus it cannot trail out from between the rollers.

The rollers 60 and 62 are each provided with a spindle 66 suitably journaled in bearings 68 supported in the frame structure 22. The roller 60 is provided with a pinion gear 70 in its spindle 66 whereas the roller 62 is provided with a pinion gear 72 on its spindle 66. As clearly shown in FIGURE 5, the pinion gear 70 lies in a different vertical plane from the pinion gear 72 and consequently the rollers can be controlled by simultaneously rotating them in counter or opposite directions by separate rack members 74 and 76 respectively meshing with the pinion gears 70 and 72 on opposite sides of the same. The rack members 74 and 76 are both operatively connected to a head member 78 carried on the outer end of a piston rod 80 of air cylinder 82. As mentioned above, when the rollers 60 and 62 are installed in the frame structure 22, they are arranged with the grooves 64 facing one another so as to permit the tubular fabric F to pass therebetween unobstructed and guided as shown in FIGURES 1, 4 and 5. The rack members 74 and 76 respectively engage the pinions 70 and 72 on opposite sides thereof. When the air cylinder 82 is actuated and the piston rod 80 extends to the right of FIGURE 4 or 5, it will now be appreciated that the rack members 74 and 76 will cause the rollers to rotate about their respective axes in opposite directions as indicated by the arrows with the curved peripheral surface of the rollers coming into contact with the tubular fabric F therebetween. When the rollers 60 and 62 are in their inoperative and stationary position as indicated in FIGURES 1, 4 and 5, the opposed grooves 64 define a passageway large enough for the tubular fabric F to pass therebetween with no interference from the rollers and thus it may be stated that the rollers have a varying nip.

Figure 6:
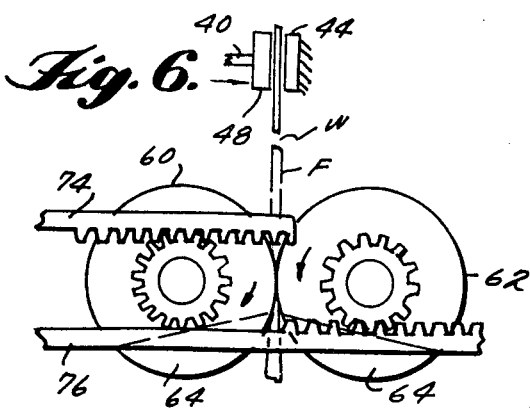
FIGURE 6 is a diagrammatic view illustrating the clamping means clamping the tubular fabric and the pulling rollers being operated to pull the fabric against the clamping means to thereby rupture the weakened portion of the tubular fabric.

Referring to FIGURE 6, the clamping bar 48 is illustrated diagrammatically in clamping engagement with the stationary clamping bar 44. Additionally, the view in FIGURE 6 further illustrates the ripping or tearing of the tubular fabric at the weakened portion W by means of the pull exerted on the fabric by rotation of the rollers 60 and 62. It will be noted that the rack members 74 and 76 are in the process of moving to the right and the rollers 60 and 62 are rotating counter to one another. The grooves 64 have moved away from their opposed relationship and the peripheral cylindrical portion of the surface of the rollers provide a nip exerting a downwardly pulling force on the fabric F. This downwardly pulling force is sufficient to cause the tubular fabric F to tear at the weakened portion W even though the rollers are rotated no more than one revolution. Once the rollers have been rotated sufficiently to tear the fabric F, the rack members 74 and 76 are moved to the left of FIGURE 6 to return the rollers to the position shown in FIGURES 4 and 5 and the torn off article is then transferred through a downwardly extending tube or funnel 90 beneath the rollers by means of an air blast from the line 93. The air line 92 may be connected to a suitable source of air under pressure, the air line being provided with a valve 93 actuated in timed sequence with the separating operation. For example, the air valve 92 may be opened by one of rack members 74 or 76 at the end of its stroke just when separation is completed.

FIGURE 4 diagrammatically illustrates a simplified means for effectively controlling the sequential operation of the clamping means 24 and the pulling means 26. As shown, a microswitch 100, connected to the same 12 volt source of power normally operating the circular knitting machine 10, is actuated at predetermined intervals by means of links provided on the pattern chain 20 at predetermined positions. The microswitch 100 controls the energizing and deenergizing of the electric circuits for operating the air cylinders 36 and 82 respectively. Air cylinder 36 receives its operating fluid from air inlet line 102 connected to solenoid-actuated air valves 104 and 106, respectively. The solenoid-actuated air valves supply air to the air cylinder 36 on one side or the other side of the piston therein as desired. For example, when the microswitch 100 is closed, energizing the circuit to the solenoid-actuated air valves 104 and 106 respectively, the valve 104 will be moved to a position where air under pressure from the line 102 flows through the valve 104 into the line 108 and into the cylinder 36 so as to urge the piston 38 to the right thereof. Solenoid-actuated valve 106 will have been moved to a position where it is closed off from the supply line 102 but is open to atmosphere at 110 so that air can flow through the line 112 from behind the piston. The reverse of the above-described operation occurs when the circuit to the solenoid valves 104 and 106 are deenergized.

Microswitch 100 may also be used to energize the circuit to solenoid-actuated valves 114 and 116 for the air cylinder 82. A timer 118 may be provided in this circuit if it is desired to have a time lag between the actual clamping by the clamping means 24 and the application of tension by the pulling means 26. Assuming that the circuit to the solenoid valves 114 and 116 has been energized, the valve 116 is opened to a position so that air under pressure is received in the air cylinder from the supply line 120 and thus moves the piston rod 80 to the right of FIGURES 1 and 4. Of course, valve 114 is moved to such a position so that air on the opposite side of the piston can be exhausted to atmosphere. When the circuit to the solenoid-operated valves 114 and 116 is deenergized, the reverse procedure occurs in that air under pressure from the line 120 passes through the crossover line 122 and enters the air cylinder through the valve 114, thus returning the rollers to the position shown in FIGURE 4.

Referring to FIGURE 8 of the drawings, there is disclosed a modified form of rollers 60′ and 62′ for the present invention. It will be understood that the rollers 60′ and 62′ are mounted in the frame structure 22 of the apparatus in the same manner as the rollers 60 and 62, and, of course, the rotation of the rollers 60′ and 62′ is accomplished identically to the rollers 60 and 62. As shown in FIGURE 8, the rollers 60′ and 62′ are cylindrical in shape but rather than providing the rollers with transverse grooves 64, each of the rollers is provided with a longitudinally extending flat surface 64′ across the chord of its cylinder. When the rollers 60′ and 62′ are mounted in the frame structure 22, they are so positioned that their flat surfaces 64′ oppose one another and thus define the cutaway portion for unobstructed passage of the tubular fabric F therebetween. In order to prevent the tubular fabric F from moving sideways from between the rollers 60′ and 62′ when the rollers are stationary, plate-like members 65 are provided adjacent the ends of the rollers and thus a confined passageway is provided between the rollers when the rollers are stationary. Separation of the tubular fabric F is accomplished in the same manner as heretofore described in that when it is desired to make a separation, the clamping means 24 is actuated to clamp the tubular fabric F above a weakened portion W, the rollers 60′ and 62′ being oppositely rotated on their axes so that the flat surfaces 64′ move away from their opposed relationship with the peripheral surfaces of the rollers forming a nip and engaging the tubular fabric to exert a downward pull on the same.

The apparatus heretofore described and illustrated in the drawings fully and effectively accomplish the objects and advantages of the present invention. It will be noted that the present invention maintains the tubular fabric F on a substantially vertical axis in its movement downwardly from the needle cylinder 14 through the apparatus during the separation operation and also during movement of the fabric in between the separation operation. It will be realized that the foregoing specific embodiments may be modified without departing from the spirit and principles of the invention. For example, the rollers could be provided with a cam-like surface to provide the varying nip rather than being cylindrical in shape with a cutaway portion and yet the fabric could still pass through the rollers at all times.

Therefore, the terminology used in the specification is for the purpose of description and not limitation.

What is claimed is:
1. A device for positively engaging and differentially conveying an article passing therethrough comprising: a pair of rollers through which the article passes, said rollers having peripheral surfaces defining a nip which cooperates to positively engage and convey the article during a portion of the rotation of the rollers and which is out of contact with the article during another portion of the rotation of the rollers, at least one of said rollers having at least a portion of its peripheral surface cut away whereby when said cutaway portion is positioned adjacent the peripheral surface of the other of said rollers, the nip defined thereby is out of contact with the article passing through said rollers; and means to rotate said rollers, said rotating means including means to intermittently rotate said rollers, said rollers, when stationary, being in a position where the peripheral surfaces of said rollers defining the nip are out of contact with the article passing therethrough.

2. A device as claimed in claim 1 wherein both of said rollers have peripheral cutaway portions.

3. A device as claimed in claim 1 wherein said rotating means reciprocates each of said rollers, said rollers being rotated no more than 360 degrees in either direction.

References Cited

UNITED STATES PATENTS

| 1,658,723 | 2/1928 | Jensen | 226—116 X |
| 3,058,641 | 10/1962 | Peterson | 226—153 X |
| 3,105,349 | 10/1963 | Palm et al. | 226—153 X |
| 3,144,747 | 8/1964 | Palm et al. | 226—153 X |

ALLEN N. KNOWLES, Primary Examiner